_United States Patent Office_ 3,335,462
Patented Aug. 15, 1967

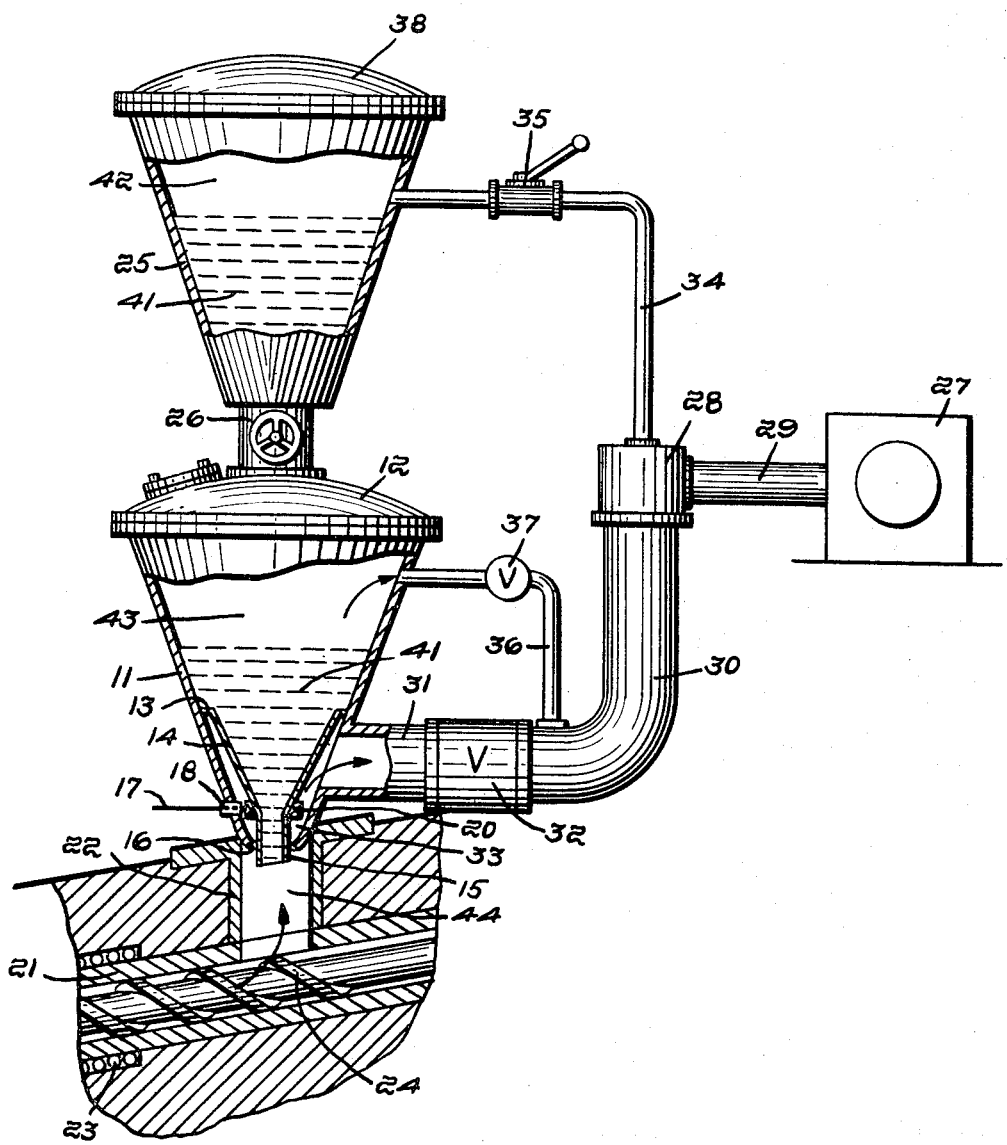

3,335,462
VACUUM INJECTION MOLDING APPARATUS
Hans Grigull, Cologne-Ehrenfeld, and Karl Heinz Mirgel, Bergisch-Gladbach, Germany, assignors to Leybold Holding A.G., Zug, Switzerland, a Swiss company
Filed July 16, 1964, Ser. No. 383,041
Claims priority, application Germany, July 17, 1963, L 43,193
12 Claims. (Cl. 18—30)

This invention relates to vacuum injection molding apparatus and more particularly to a vacuum injection molding apparatus which is capable of continuous operation.

Injection molding is a well known method of producing objects of pliable materials such as, for example, thermoplastic polymerates. With this process however errors can occur during the molding which cause a quality reduction of the finished part.

Parts can exhibit, for example, air bubbles, scorched parts, seam errors, etc. The errors are caused by air pockets remaining in the mold after the injection of the molding material. A very tight mold aggravates the problem by preventing escape of trapped air during the molding process. Air cushions cause an incomplete flow of the injection material into the mold, thereby producing air bubbles in the product. Also, such air cushions can be locally heated by the injection pressure to such an extent that scorched areas will occur in the finished product.

Another problem is the production of seam faults in the product if the injected mass cools unevenly. The material in the mold must be heated to the thermal limit so as to reduce its viscosity. If then the mold joints are very tight, the enclosed air can escape only with difficulty which leads to an uneven cooling of the injected material. As a result of the unequal cooling, visible seams can occur in the finished product.

To avoid the above difficulties, apparatus has been developed for injecting the casting material into a mold of reduced pressure. In spite of mold evacuation, however, the molded product can still exhibit water inclusions if the granular material used for the injection has a high moisture content. During the casting process these water inclusions will produce bubbles which have similar adverse effects on the quality of the finished product.

Vacuum injection molding apparatus has been developed which provides degassing of the casting material prior to its injection into the casting mold. Such apparatus is shown and described in U.S. patent application No. 315,856, filed Oct. 14, 1963, by H. Grigull and now abandoned. Although alleviating the problems mentioned above, this equipment has the disadvantage of requiring a stoppage of the molding operation during periods when new batches of casting material are being degassed. Such stoppages greatly reduce the efficiency of the high speed molding operations.

The object of this invention therefore is to provide a continuously operable vacuum injection molding apparatus which will consistently produce uniform and fault free molded products.

One feature of this invention is the provision of a vacuum injection molding apparatus having an evacuable primary supply vessel adapted to supply casting material to an evacuable mold and an evacuable auxiliary supply vessel connected to the primary supply vessel by a vacuum valve.

Another feature of this invention is the provision of a vacuum injection molding apparatus of the above featured type including a single vacuum pumping system for evacuating both the primary and auxiliary casting material supply vessels, a primary evacuation line connected between the pumping system and the primary supply vessel, and a valved auxiliary evacuation line of substantially smaller cross section connected between the pumping system and the auxiliary supply vessel.

Another feature of this invention is the provision of a vacuum injection molding apparatus of the first featured types wherein the primary supply vessel is adapted to produce the free fall of casting material through an evacuable space connected to the primary evacuation line and including a supplemental evacuation line connected between the pumping system and the upper portion of the primary supply vessel.

Another feature of this invention is the provision of a vacuum injection molding apparatus of the above featured type wherein the supplemental evacuation line is of substantially smaller cross section than the primary evacuation line.

Another feature of this invention is the provision of a vacuum injection molding apparatus of the above featured type wherein the primary supply vessel includes a double walled portion of which the inner wall thereof supports the stored casting material and the annular space between the double walls provides a gas communication path between the primary evacuation line and the evacuable space through which the casting material falls.

Another feature of this invention is the provision of vacuum valves in both the primary evacuation line and the supplementary evacuation line.

Another feature of this invention is the provision of a vacuum injection molding apparatus of the above featured type wherein the double walled supply vessel portion is formed by a pair of inverted concentric cones and wherein the angle of the inner cone is greater than the angle of the outer cone.

These and other features and advantages of the present invention will become more apparent upon a perusal of the following description taken in conjunction with the accompanying drawing which is a schematic showing partly in cross section of a preferred embodiment of the invention.

Shown in the drawing is the cone-shaped primary supply vessel 11 having a demountable cover 12. Gas tightly attached to the inner wall of the primary supply vessel 11 is a solid ring 13 which supports the concentric inner cone member 14. Attached to the lower end of inner cone 14 is a hollow cylinder 15 which extends through an aperture 16 in the bottom of the primary supply vessel 11. Surrounding and in intimate contact with the lower portion of the inner cone 14 is an electrical heating band 20 connected to an electrical feed through 17 which extends through the electrical insulator 18 mounted in the wall of primary supply vessel 11.

The primary supply vessel 11 is mounted on a filling tube 21 by the hollow flanged feeder tube 22. Electrical heating coils 23 encircle the filling tube 21 which encloses a material conveyor screw 24. Mounted above the primary vessel demountable cover 12 is the auxiliary supply vessel 25 having a demountable cover 38. An aperture in the bottom of auxiliary supply vessel 25 is gas tightly connected to an aperture in primary vessel cover plate 12 by the vacuum valve 26.

A mechanical vacuum pump 27 is connected to the manifold 28 by a connecting tube 29. The primary evacuation line 30, 31 and the vacuum valve 32 connect the manifold 28 with the annular space 33 between the primary supply vessel 11 and inner cone 14. The auxiliary vacuum evacuation line 34 and vacuum valve 35 provide gas communication between the manifold 28 and the aperture in the upper portion of auxiliary supply vessel 25. The supplementary evacuation line 36 and vacuum valve 37 provide gas communication between primary evacuation line 30 and an aperture in the upper portion of primary supply vessel 11.

During operation of the apparatus shown in the figure the auxiliary supply vessel 25 is filled with a suitable casting material 41 through the demountable cover 38. With the connecting valve 26 in the closed position, the casting material 41 is predegassed by evacuating the upper portion 42 of auxiliary supply vessel 25 via auxiliary evacuation line 34 and open vacuum valve 35. the predegassed material 41 is then emptied into primary supply vessel 11 through the opened vacuum valve 26. The material 41 is warmed within the primary supply vessel 11 by contact with the inner cone 14 which is heated by the heating band 20. Electrical energy is supplied to the heating band 20 by the feed through 17 from a suitable source of electrical power (not shown). The opening in the bottom of the cylindrical tube 15 allows a continuous stream of casting material 41 to fall through the open space 44 within feeding tube 22. The freely falling material is continuously transmitted to a suitable vacuum molding machine (not shown) by the conveyor screw 24. The molding machine may be, for example, of the type shown and described in the above mentioned U.S. patent application, Serial No. 315,856.

As the predegassed material 41 falls through the stream degassing space 44, an additional quantity of the gas remaining in the material is removed through the gas removable path comprising the annular space 33, primary evacuation line 30, 31, open vacuum valve 32, manifold 28, and connecting tube 29.

A primary advantage of the present invention is that after filling of the primary supply vessel 11 the vacuum valves 26 and 35 can be closed and auxiliary cover plate 38 opened to reload auxiliary supply vessel 25 with casting material 41. The valve 35 is then opened to evacuate the inner chamber 42 and predegas the contained material 41 during the period required to exhaust the supply of material contained in the primary supply vessel 11. Thus the primary supply vessel 11 need never be exposed to atmospheric conditions and the molding operation can continue indefinitely without interruption while providing a fresh supply of casting material.

It is preferred that the auxiliary evacuation line 34 be substantially smaller in cross section than the primary evacuation line 30, 31. For example, a cross section for auxiliary line 34 of about 1/10 that of primary evacuation line 30, 31 is effective. This allows the evacuation of auxiliary supply vessel 25 and the stream degassing space 44 with a single vacuum pumping system while also preventing a substantial pressure rise in the degassing space 44 immediately after filling of the auxiliary supply vessel 25 and opening of the vacuum valve 35. The relatively small conductance of the auxiliary line 34 prevents the atmospheric condition existing in the auxiliary supply vessel 25 immediately after filling from substantially affecting the pressure in the degassing space 44. This is important because any substantial pressure rise in the stream degassing space 44 would cause a quantity of incompletely degassed casting material 41 to reach the vacuum molding machine thus producing an inferior product.

The use of supplementary evacuation line 36 also increases the effectiveness of the molding apparatus. With this line it is possible to reduce the pressure in the space 43 above the casting material 41 thereby providing additional predegassing in addition to eliminating flow resistance when the primary supply vessel 11 is being filled with material through open connecting vacuum valve 26. Without a supplementary evacuation line a material flow resisting pressure can occur in the space 43 because of the outgassing produced by the heating of the casting material. Here again the cross section of the supplementary evacuation line 36 should be substantially smaller than the primary evacuation line 31 for the reasons discussed above. The valve 37 allows closing of the supplementary evacuation line 36 during actual filling of the primary supply vessel 11 and thus prevents lightweight particles in the casting material 41 from being sucked into the vacuum pump 27. It is also possible to use an adjustable throttle valve 37 which allows regulation of the pressure in the space 43 and establishment of a desired pressure differential between the space 43 and the stream degassing space 44. With this pressure differential it is possible to control the flow rate of casting material out of the opening in cylindrical tube 15 and thus establish a suitable rate of flow for various types of casting material in the same piece of molding apparatus.

The particular double walled form of the primary supply vessel 11 provides extremely efficient heating of the casting material 41 before entry into the open stream degassing space 44 which heating produces much more effective degassing of the material. Because the inner heated inner cone 14 is in contact with the primary supply vessel 11 only along the limited external circumferential surface of the mounting ring 13, the heat loss is minimized and substantially all the heating energy supplied is beneficially used in heating the casting material. The double cone construction is advantageous in that the inner cone 14 provides a desired funneling of the casting material while the similarly shaped outer cone wall 11 requires a minimum of construction material. Also an inner cone 14 having a larger angle than that of the conical primary supply vessel 11 is an efficient, economical arrangement. This arrangement provides the annular space 32 which serves as an evacuation path for the stream degassing space 44 and as a heat loss barrier while also providing maximum storage area in the primary supply vessel 11. As the spacing between the primary supply vessel 11 and inner cone 14 is increasing from top to bottom, the circumference of the annular space 33 is decreasing. Therefore the cross sectional area of the annular space 33 and the gas conductance therein can be established at a substantially constant required value while also providing maximum utilization of the storage area within the primary supply vessel 11. The extension of the cylindrical tube into the degassing space 44 is also desirable in that it lengthens the annular evacuation space 33 and thus prevents suction removal of fine casting material particles into the vacuum pump 27. The length of the cylindrical tube 15 can be selected in accordance with the particular casting material utilized.

Thus the present invention provides a vacuum injection molding apparatus which consistently produces error free molded pieces by uniquely degassing the casting material before the molding operation. Furthermore, the molding apparatus is capable of continuous operation thereby greatly improving the efficiency of such machines.

Obviously many modifications and variations of the present invention are possible in the light of the above teachings. It is therefore to be understood, that within the scope of the appended claims, the invention may be practiced otherwise than as specifically described.

What is claimed is:

1. A vacuum injection molding apparatus comprising in combination:

an evacuable filling means for supplying casting material to a vacuum mold; an evacuable primary supply vessel, communicating with said filling means, for supplying casting material to said filling means; an evacuable auxiliary supply vessel, communicating with said primary supply vessel, for supplying casting material to said primary supply vessel; said filling means and said vessels being disposed for gravity flow of casting material from said auxiliary vessel to said primary vessel, and from said primary vessel to said filling means;

evacuation means for said vessels and said filling means comprising a vacuum pump, a primary evacuation line connecting said pump and said primary supply vessel, and an auxiliary evacuation line connecting said pump and said auxiliary supply vessel; said auxiliary line having a small conductance relative to said primary line; valve means in said auxiliary line; and vacuum valve means connected between said primary and auxiliary supply vessels for controlling the flow of casting material therebetween, and for effecting gas isolation between said vessels.

2. The apparatus according to claim 1 wherein the lower end of said primary supply vessel defines a degassing space, communicating with said filling means, and nozzle means for discharging a stream of casting material through said degassing space to said filling means; and wherein said primary evacuation line communicates with said degassing space.

3. The apparatus according to claim 2 including a supplementary evacuation line connected between said primary line and the upper portion of said primary vessel; and valve means in said supplementary line for controlling flow therethrough.

4. The apparatus according to claim 2 wherein said primary supply vessel includes inner and outer walls between which is formed a gas evacuation path, said inner wall defining said nozzle means; said gas evacuation path connecting said primary evacuation line and said stream degassing space.

5. The apparatus according to claim 4 including heating means disposed in said gas evacuation path for heating said inner wall.

6. The apparatus according to claim 4 wherein said inner wall has an inverted conical form, and is attached to said outer wall along the upper portion of said inner wall; said inner and outer walls defining an annular gas evacuation path opening at the bottom thereof to said degassing space; and wherein said primary evacuation line communicates with an opening in said outer wall opening to said annular gas evacuation path.

7. The apparatus according to claim 6 wherein the lower portion of said primary vessel has an inverted conical form; and wherein the cone angle of said inner wall is greater than the cone angle of said outer wall, to define an annular gas evacuation path having substantially uniform cross section throughout its length.

8. A vacuum injection molding apparatus comprising in combination:
an evacuable filling means for supplying casting material to a vacuum mold; an evacuable supply vessel communicating with said filling means, and disposed above said filling means for supplying casting material to said filling means by gravity flow;
the lower end of said supply vessel defining a degassing space, communicating with said filling means, and nozzle means for discharging a stream of casting material through said degassing space to said filling means;
evacuation means for said supply vessel and said filling means comprising a vacuum pump, a primary evacuation line connecting said pump and said degassing space of said supply vessel, a supplementary evacuation line connected between said pump and the upper portion of said supply vessel, and valve means in said supplementary line for controlling flow therethrough.

9. The apparatus according to claim 8 wherein said supply vessel includes inner and outer walls between which is formed a gas evacuation path, said inner wall defining said nozzle means; said gas evacuation path connecting said primary evacuation line and said stream degassing space.

10. The apparatus according to claim 9 including heating means disposed in said gas evacuation path for heating said inner wall.

11. The apparatus according to claim 9 wherein said inner wall has an inverted conical form, and is attached to said outer wall along the upper portion of said inner wall; said inner and outer walls defining an annular gas evacuation path opening at the bottom thereof to said degassing space; and wherein said primary evacuation line communicates with an opening in said outer wall opening to said annular gas evacuation path.

12. The apparatus according to claim 11 wherein the lower portion of said supply vessel has an inverted conical form; and wherein the cone angle of said inner wall is greater than the cone angle of said outer wall, to define an annular gas evacuation path having a substantially uniform cross-section throughout its length.

References Cited

FOREIGN PATENTS 925,502  5/1963  Great Britain.

J. SPENCER OVERHOLSER, *Primary Examiner.*

WILBUR L. McBAY, *Assistant Examiner.*